(12) United States Patent
Akatsuka (10) Patent No.: US 12,454,449 B2
(45) Date of Patent: Oct. 28, 2025

(54) OBSTACLE NOTIFICATION DEVICE FOR INDUSTRIAL VEHICLE AND INDUSTRIAL VEHICLE

(71) Applicant: KABUSHIKI KAISHA TOYOTA JIDOSHOKKI, Kariya (JP)

(72) Inventor: Keisuke Akatsuka, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 70 days.

(21) Appl. No.: 18/322,098

(22) Filed: May 23, 2023

(65) Prior Publication Data

US 2023/0382704 A1 Nov. 30, 2023

(30) Foreign Application Priority Data

May 27, 2022 (JP) ................................. 2022-087058

(51) Int. Cl.
*B66F 9/075* (2006.01)
*B60W 50/00* (2006.01)
*B60W 50/14* (2020.01)

(52) U.S. Cl.
CPC ....... *B66F 9/0755* (2013.01); *B60W 50/0098* (2013.01); *B60W 50/14* (2013.01); *B60W 2050/146* (2013.01); *B60W 2300/121* (2013.01); *B60W 2420/403* (2013.01); *B60W 2540/18* (2013.01)

(58) Field of Classification Search
CPC . B66F 9/0755; B60W 50/0098; B60W 50/14; B60W 2050/146; B60W 2300/121; B60W 2420/403; B60W 2540/18

USPC ....................................................... 340/425.5
See application file for complete search history.

(56) References Cited

U.S. PATENT DOCUMENTS

| 8,150,593 | B2* | 4/2012 | Taki | B60T 7/22 340/436 |
|---|---|---|---|---|
| 12,065,804 | B2* | 8/2024 | Clare | B60Q 1/543 |
| 2017/0227629 | A1* | 8/2017 | Sorensen | B66F 9/0755 |
| 2018/0178720 | A1* | 6/2018 | Ohtani | G08G 1/04 |
| 2020/0148223 | A1* | 5/2020 | Fukatani | G05D 1/0088 |
| 2021/0009392 | A1* | 1/2021 | Kamiya | G05D 1/0022 |
| 2021/0157326 | A1* | 5/2021 | Takai | G05D 1/0255 |
| 2021/0402998 | A1* | 12/2021 | Inoue | B60W 10/18 |

(Continued)

FOREIGN PATENT DOCUMENTS

| JP | 2000-177513 A | 6/2000 |
|---|---|---|
| JP | 2008-254710 A | 10/2008 |

(Continued)

*Primary Examiner* — Naomi J Small
(74) *Attorney, Agent, or Firm* — Sughrue Mion, PLLC (57) ABSTRACT

An obstacle notification device includes an obstacle detection unit configured to detect a positional relationship between an industrial vehicle and an obstacle, a display unit, and processing circuitry. The processing circuitry displays an image for notifying an operator of the presence of the obstacle on the display unit, and executes at least one of restriction of traveling of the industrial vehicle and warning when the obstacle is a causal obstacle meeting a specific condition. The processing circuitry displays a first image on the display unit when notifying the operator of the presence of an obstacle different from the causal obstacle, and displays a second image that is different from the first image on the display unit when notifying the operator of the presence of the causal obstacle.

5 Claims, 4 Drawing Sheets

(56) References Cited

U.S. PATENT DOCUMENTS

| | | | |
|---|---|---|---|
| 2022/0081271 A1* | 3/2022 | Stacy | G05D 1/2247 |
| 2022/0198809 A1 | 6/2022 | Oami et al. | |
| 2022/0260999 A1* | 8/2022 | Hattori | G05D 1/0246 |
| 2022/0274525 A1* | 9/2022 | Ishizaki | B66F 9/0755 |
| 2022/0402733 A1* | 12/2022 | Kim | B66F 9/063 |
| 2022/0411246 A1 | 12/2022 | Kubotani et al. | |
| 2023/0106964 A1* | 4/2023 | Uro | G05D 1/0016 |
| | | | 701/2 |
| 2023/0339734 A1* | 10/2023 | Stahle | B60W 50/14 |

FOREIGN PATENT DOCUMENTS

| | | |
|---|---|---|
| JP | 2022-012369 A | 1/2022 |
| WO | 2020/213105 A1 | 10/2020 |
| WO | 2021/111839 A1 | 6/2021 |

* cited by examiner

OBSTACLE NOTIFICATION DEVICE FOR INDUSTRIAL VEHICLE AND INDUSTRIAL VEHICLE

BACKGROUND

1. Field

The present disclosure relates to an obstacle notification device for an industrial vehicle and an industrial vehicle.

2. Description of Related Art

An obstacle detection device disclosed in Japanese Laid-Open Patent Publication No. 2008-254710 detects an obstacle with a camera mounted on a vehicle. When detecting an obstacle, the obstacle detection device notifies a vehicle operator of the type and the position of the obstacle.

When there is an obstacle meeting a specific condition, an industrial vehicle may perform at least one of restriction of traveling of the industrial vehicle and warning. An industrial vehicle is desired to notify its operator of the presence of an obstacle that causes at least one of restriction of traveling of the industrial vehicle and warning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an obstacle notification device for an industrial vehicle is provided. The obstacle notification device includes an obstacle detection unit configured to detect a positional relationship between the industrial vehicle and an obstacle, a display unit, and processing circuitry. The processing circuitry is configured to display, on the display unit, an image for notifying an operator of the presence of the obstacle, and execute at least one of restriction of traveling of the industrial vehicle and warning when the obstacle is a causal obstacle meeting a specific condition. The processing circuitry is further configured to display a first image on the display unit when notifying the operator of the presence of the obstacle different from the causal obstacle, and display a second image that is different from the first image on the display unit when notifying the operator of the presence of the causal obstacle.

In another general aspect, an industrial vehicle includes the above-described the obstacle notification device, a steered wheel, and a tire angle sensor configured to detect a steered angle of the steered wheel. The processing circuitry is configured to determine an expected travel area of the industrial vehicle based on a detection result of the tire angle sensor, and execute restriction of traveling of the industrial vehicle and display the second image on the display unit when the expected travel area agrees with a restriction area in which the causal obstacle exists, among multiple restriction areas set in a traveling direction of the industrial vehicle.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An obstacle notification device for an industrial vehicle and an industrial vehicle according to one embodiment will now be described.

<Forklift>

Figure 1:
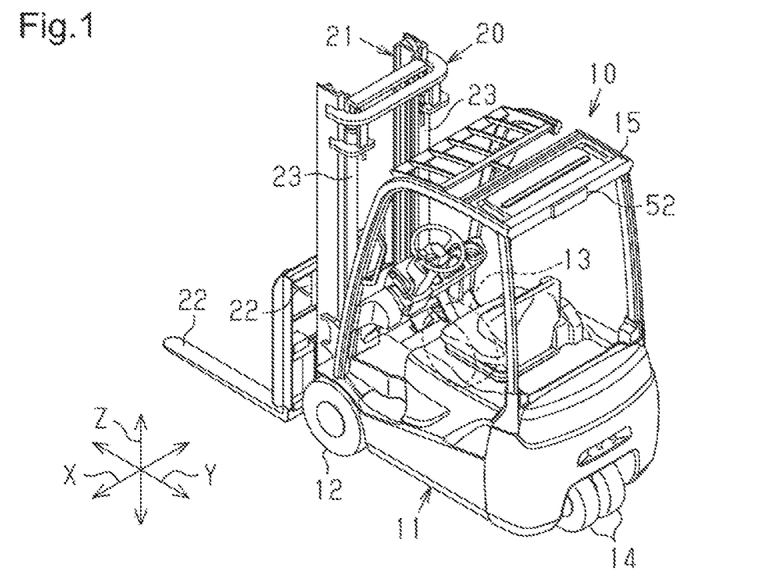
FIG. 1 is a perspective view of the forklift.

As shown in FIG. 1, a forklift 10, which is an industrial vehicle, includes a vehicle body 11, two driven wheels 12, 13 disposed at a front portion of the vehicle body 11, two steered wheels 14 disposed at a rear portion of the vehicle body 11, and a cargo handling device 20. The two driven wheels 12, 13 are disposed to be separated from each other in a vehicle width direction. The two steered wheels 14 are disposed adjacent to each other in the vehicle width direction. The two steered wheels 14 are disposed at a central position between the driven wheels 12, 13 in the vehicle width direction. When the two steered wheels 14 disposed adjacent to each other are regarded as a single steered wheel 14, the forklift 10 can be regarded as a three-wheel forklift. The vehicle body 11 includes a head guard 15 provided above the driver's seat. In the following description, front, rear, left, and right refer to front, rear, left, and right of the forklift 10.

The cargo handling device 20 includes a mast 21, two forks 22, and lift cylinders 23. The mast 21 is provided in front of the vehicle body 11. The forks 22 are lifted and lowered together with the mast 21. A cargo is mounted on the forks 22. The lift cylinders 23 include hydraulic cylinders. The lift cylinders 23 are extended or retracted to lift or lower the mast 21. The forks 22 are lifted or lowered as the mast 21 is lifted or lowered. The forklift 10 of the present embodiment is operated by an operator to perform a traveling operation and a cargo handling operation.

Figure 2:
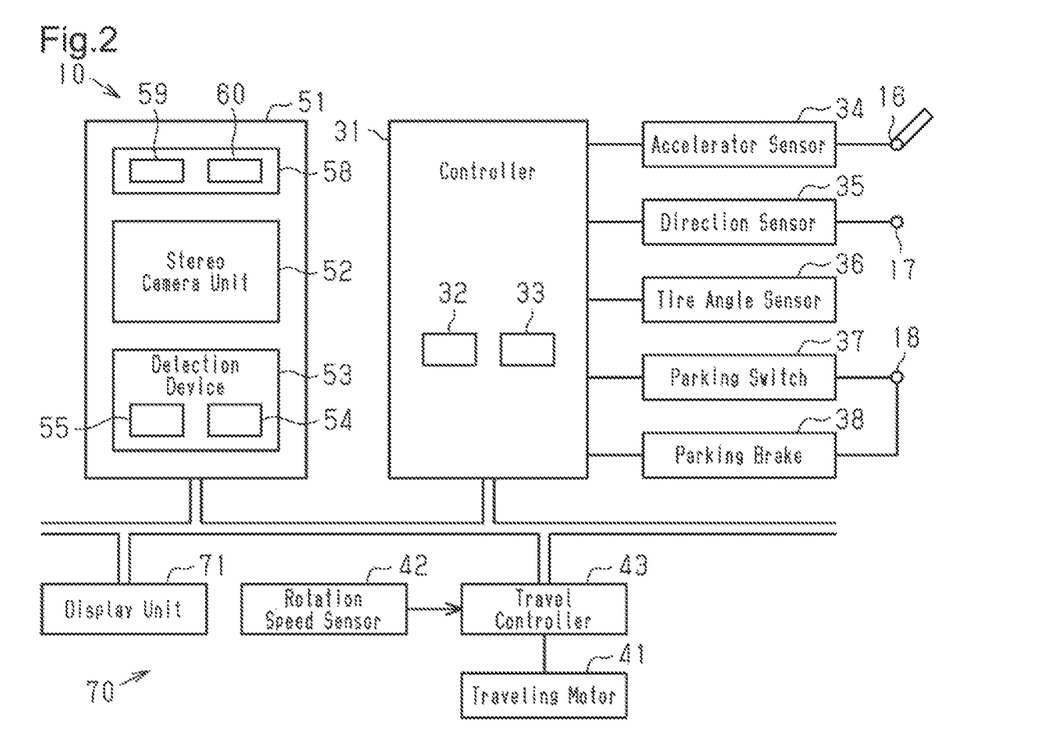
FIG. 2 is a schematic diagram of the forklift shown in FIG. 1.

As shown in FIG. 2, the forklift 10 includes an accelerator pedal 16, a direction lever 17, a parking brake operating member 18, an accelerator sensor 34, a direction sensor 35, a tire angle sensor 36, a parking switch 37, a parking brake 38, traveling motors 41, a rotation speed sensor 42, a travel controller 43, and an obstacle notification device 70 for an industrial vehicle. The obstacle notification device 70 of the industrial vehicle includes a controller 31, an obstacle detection unit 51, and a display unit 71.

The controller 31 includes a processor 32 and a memory unit 33. The processor 32 may include, for example, a central processing unit (CPU), a graphics processing unit (GPU), or a digital signal processor (DSP). The memory unit 33 includes a random-access memory (RAM) and a read-only memory (ROM). The memory unit 33 stores programs for operating the forklift 10. The memory unit 33 stores program codes or commands configured to cause the processor 32 to execute processes. The memory unit 33, which is a computer-readable medium, includes any type of medium that is accessible by a general-purpose computer or a dedicated computer. The controller 31 may include a hardware circuit such as an application specific integrated circuit (ASIC) and a field programmable gate array (FPGA). The controller 31, which is processing circuitry, may include one or more processors that operate according to a computer program, one or more hardware circuits such as an ASIC and an FPGA, or a combination thereof.

The accelerator sensor 34 detects an operation amount of the accelerator pedal 16, that is, an accelerator operation amount. The accelerator sensor 34 outputs an electric signal that corresponds to the accelerator operation amount to the controller 31. The controller 31 acquires the accelerator operation amount based on the electric signal from the accelerator sensor 34.

The direction sensor 35 detects the operated direction of the direction lever 17, which indicates the traveling direction. The direction sensor 35 detects whether the direction lever 17 is operated in the direction instructing a forward movement or the direction instructing a reverse movement with reference to a neutral position. The direction sensor 35 outputs an electric signal corresponding to the operated direction of the direction lever 17 to the controller 31. The controller 31 acquires the operated direction of the direction lever 17 based on the electric signal from the direction sensor 35. The controller 31 recognizes whether a forward movement is instructed by the operator, whether a reverse movement is instructed by the operator, or whether neither is instructed by the operator.

The tire angle sensor 36 detects a steered angle of the steered wheels 14. The tire angle sensor 36 outputs an electric signal corresponding to the steered angle to the controller 31. The controller 31 acquires the steered angle based on the electric signal from the tire angle sensor 36.

The parking brake 38 is switched between an activated state and a deactivated state by the parking brake operating member 18. The parking brake 38 may be a mechanical type or an electric type. The mechanical type is a type in which the parking brake 38 is directly operated by connecting the parking brake 38 and the parking brake operating member 18 with a wire. The electric type is a type in which the parking brake 38 is electrically operated by operation of the parking brake operating member 18.

The parking switch 37 detects whether the parking brake 38 is operated. The parking switch 37 is turned on when the parking brake 38 is operated by the parking brake operating member 18. The parking switch 37 is turned off when the parking brake 38 is deactivated by the parking brake operating member 18.

The traveling motors 41 are driving devices that cause the forklift 10 to travel. When the traveling motors 41 are activated, the driven wheels 12, 13 rotate to cause the forklift 10 to travel. The traveling motors 41 are respectively provided for the driven wheels 12, 13.

The rotation speed sensor 42 detects the rotation speed of the traveling motors 41. As the rotation speed sensor 42, for example, a rotary encoder can be used. The rotation speed sensor 42 outputs an electric signal corresponding to the rotation speed of the traveling motors 41 to the travel controller 43.

The travel controller 43 is a motor driver that controls the rotation speed of the traveling motors 41. The travel controller 43 acquires the rotation speed and the rotation direction of the traveling motors 41 from electric signals of the rotation speed sensor 42. The rotation direction of the traveling motors 41 is represented by signs + and –. The sign + indicates a forward rotation, and the sign – indicates a reverse rotation.

The obstacle detection unit 51 detects the position of an obstacle. The obstacle detection unit 51 includes a stereo camera unit 52, a detection device 53, and a warning unit 58. The stereo camera unit 52 includes two cameras, and captures images with the two cameras. As shown in FIG. 1, the stereo camera unit 52 is disposed on the head guard 15. The stereo camera unit 52 is disposed to capture a bird's-eye view of the road surface on which the forklift 10 travels from above the forklift 10. The stereo camera unit 52 of the present embodiment captures images behind the forklift 10. Accordingly, an obstacle detected by the obstacle detection unit 51 is an obstacle behind the forklift 10. The detection direction of the obstacle detection unit 51 is backward. The warning unit 58 and the detection device 53 may be unitized with the stereo camera unit 52 and disposed on the head guard 15 together with the stereo camera unit 52. Further, the warning unit 58 and the detection device 53 may be disposed at positions different from the head guard 15.

The detection device 53 includes a processor 54 and a memory unit 55. The processor 54 may include, for example, CPU, a GPU, or a DSP. The memory unit 55 includes a RAM and a ROM. The memory unit 55 stores various programs for detecting an obstacle from images captured by the stereo camera unit 52. The memory unit 55 stores program codes or commands configured to cause the processor 54 to execute processes. The memory unit 55, which is a computer-readable medium, includes any type of medium that is accessible by a general-purpose computer or a dedicated computer. The detection device 53 may include a hardware circuit such as an ASIC and an FPGA. The detection device 53, which is processing circuitry, may include one or more processors that operate according to a computer program, one or more hardware circuits such as an ASIC and an FPGA, or a combination thereof.

The detection device 53 detects an obstacle present behind the forklift 10 by repeatedly performing the following obstacle detection control at a specific control period. The detection device 53 also derives the position of the detected obstacle. The position of the obstacle is a relative position between the forklift 10 and the obstacle. The obstacle detection unit 51 detects the positional relationship between the forklift 10 and the obstacle.

Figure 3:
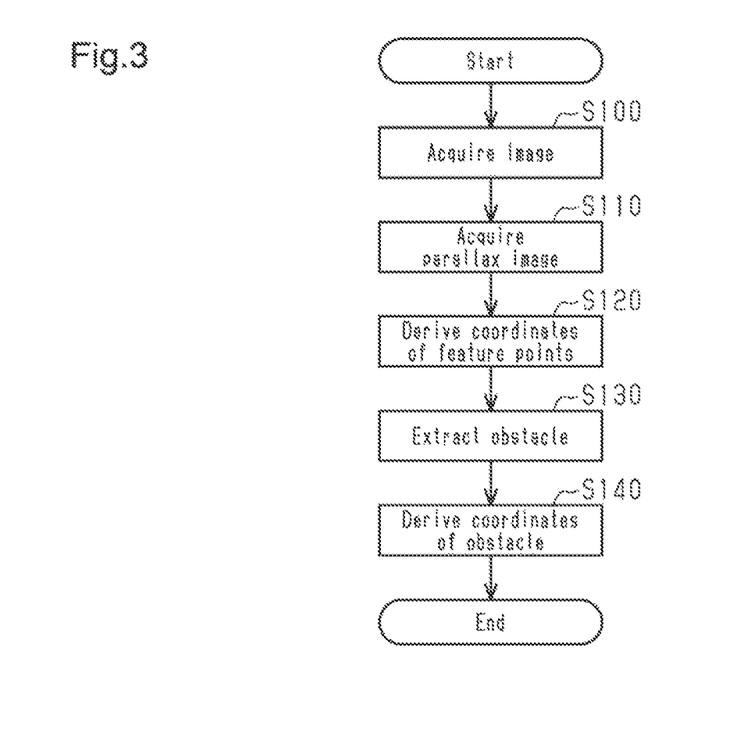
FIG. 3 is a flowchart showing an obstacle detection control.

As shown in FIG. 3, in step S100, the detection device 53 acquires an image from the stereo camera unit 52.

Next, in step S110, the detection device 53 acquires a parallax image by performing stereo processing. The parallax image is obtained by associating a parallax [px] with pixels. The parallax image does not necessarily need to be displayed, and indicates data in which parallax is associated with each pixel in the parallax image. The parallax is obtained by comparing two images captured by the stereo camera unit 52 and deriving a difference in the number of pixels between the images with respect to the same feature point appearing in each image. A feature point is a portion that can be recognized as a boundary such as an edge of an obstacle. Feature points can be detected from luminance information or the like.

Next, in step S120, the detection device 53 derives the coordinates of the feature points in the world coordinate system, which is a coordinate system in the real space. The world coordinate system is a coordinate system in which an axis extending in a vehicle width direction of the forklift 10 in a horizontal direction in a state in which the forklift 10 is positioned on a horizontal plane is an X-axis, an axis orthogonal to the X-axis in the horizontal direction is a Y-axis, and an axis extending in a vertical direction is a Z-axis. The coordinates of the feature points are derived by deriving the coordinates of the feature points in the camera coordinate system from the baseline length of the stereo camera unit 52, the focal distance of the stereo camera unit 52, and the parallax image obtained in step S110, and then converting the coordinates into the coordinates in the world coordinate system. As shown in FIG. 1, the X-axis, the Y-axis, and the Z-axis are indicated by arrows X, Y, and Z.

Next, in step S130, the detection device 53 performs extraction of an obstacle by clustering the feature points. The detection device 53 regards, as one point cloud, a set of feature points assumed to represent the same obstacle, among feature points representing a part of the obstacle, and extracts the point cloud as the obstacle. The detection device 53 performs clustering in which feature points located within a specified range are regarded as one point cloud from the coordinates of the feature points in the world coordinate system derived in Step S120. The detection device 53 regards the clustered point cloud as one obstacle. The clustering of feature points performed in step S130 can be performed by various methods.

Next, in step S140, the detection device 53 derives the coordinates of the obstacle in the world coordinate system. The coordinates of the obstacle can be derived from the coordinates of the feature points constituting the point cloud. The coordinates of the obstacle in the world coordinate system represent the relative position between the forklift 10 and the obstacle. Specifically, among the coordinates of the obstacle in the world coordinate system, the X coordinate represents the distance from the origin to the obstacle in the left-right direction, and the Y coordinate represents the distance from the origin to the obstacle in the front-rear direction. The origin is, for example, a coordinate in which the X coordinate and the Y coordinate are set to the arrangement position of the stereo camera unit 52 and the Z coordinate is set to the road surface. The Euclidean distance from the arrangement position of the stereo camera unit 52 to the obstacle can be derived from the X-coordinate and the Y-coordinate. Among the coordinates of the obstacle in the world coordinate system, the Z coordinate represents the height of the obstacle from the road surface. When the process of step S140 is finished, the detection device 53 ends the obstacle detection control.

The warning unit 58 is a device that issues a warning to the operator of the forklift 10. The warning unit 58 includes a buzzer 59 for issuing a warning by sound and a lamp 60 for issuing a warning by light.

The display unit 71 is provided at a position where it can be visually confirmed by the operator of the forklift 10. Various kinds of information related to the forklift 10 are displayed on the display unit 71.

<Control Performed by Controller>

The controller 31, the travel controller 43, and the obstacle detection unit 51 are configured to acquire information from each other. The controller 31, the travel controller 43, and the obstacle detection unit 51 acquire information from each other by performing communication in accordance with a communication protocol for vehicles such as a controller area network (CAN) or a local interconnect network (LIN).

The controller 31 derives a vehicle speed [km/h] of the forklift 10. The vehicle speed of the forklift 10 can be derived by using the rotation speed and the rotation direction of each of the traveling motors 41 provided for the respective driven wheels 12, 13, the gear ratio, the outer diameter of the driven wheels 12, 13, the steered angle detected by the tire angle sensor 36, and the like. The rotation speed and the rotation direction of each traveling motor 41 can be acquired from the travel controller 43. The gear ratio and the outer diameter of the driven wheel 12 may be stored in the memory unit 33 in advance. The controller 31 also derives the traveling direction of the forklift 10 together with the vehicle speed of the forklift 10. The traveling direction of the forklift 10 is either a forward direction or a reverse direction.

The controller 31 operates the warning unit 58 by transmitting a warning command to the obstacle detection unit 51. Specifically, the obstacle detection unit 51 includes an operation unit that operates the warning unit 58, and the operation unit operates the warning unit 58 when receiving the warning command.

<Start Restriction Area>

The controller 31 performs a start restriction control. The start restriction control is a control for restricting the start of the forklift 10 in accordance with the position of the obstacle detected by the obstacle detection unit 51. First, the start restriction area used for the start restriction control will be described.

Figure 4:
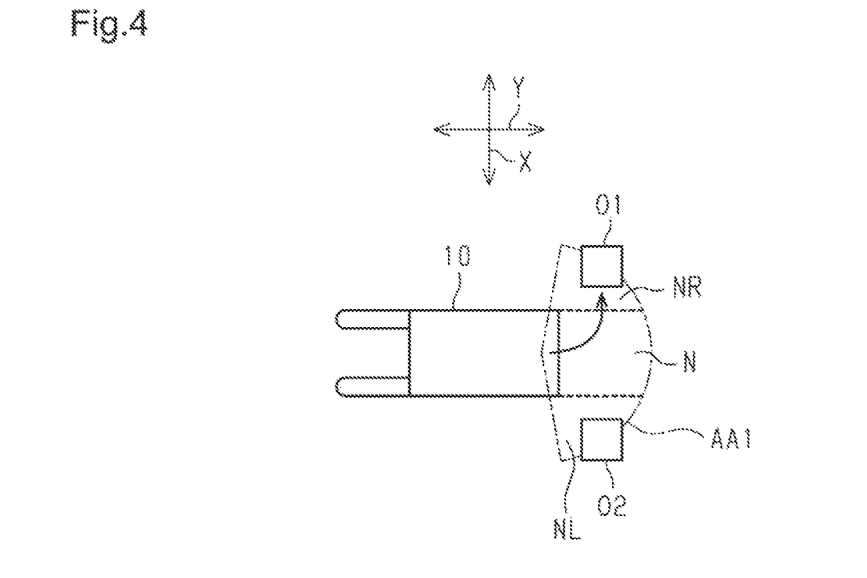
FIG. 4 is a diagram schematically showing a starting restriction area.

As shown in FIG. 4, a start restriction area AA1 used for the start restriction control is set within a detection range, in which an obstacle can be detected by the obstacle detection unit 51. The detection range, in which an obstacle can be detected by the obstacle detection unit 51, can also be referred to as an image capturing range, in which images can be captured by the stereo camera unit 52. The start restriction area AA1 is an area that extends rearward with respect to the rear of the forklift 10 from the arrangement position of the stereo camera unit 52, and in the vehicle width direction of the forklift 10. The start restriction area AA1 is an area defined by an X coordinate and a Y coordinate in the world coordinate system. In the following description, the X coordinate and the Y coordinate are coordinates in the world coordinate system.

The start restriction area AA1 is divided into three areas: a center restriction area N, a left restriction area NL, which is located on the left side of the center restriction area N, and a right restriction area NR, which is located on the right side of the center restriction area N. The center restriction area N is an area facing the forklift 10 in the front-rear direction. The dimension of the center restriction area N in the left-right direction is equal to the dimension of the forklift 10 in the vehicle width direction. The center restriction area N is an area through which the forklift 10 passes when the forklift 10 travels straight in the reverse direction. The left restriction area NL is an area through which the forklift 10 passes when the forklift 10 turns left in the reverse direction. The right restriction area NR is an area through which the forklift 10 passes when the forklift 10 turns right in the reverse direction. The size of the start restriction area AA1 in the front-rear direction and the size of the start restriction area AA1 in the left-right direction may be adjusted. The center restriction area N, the left restriction area NL, and the right restriction area NR are multiple restriction areas set in the traveling direction of the forklift 10. The center restriction area N, the left restriction area NL, and the right restriction area NR are multiple restriction areas set around the forklift 10.

<Start Restriction Control>

Figure 5:
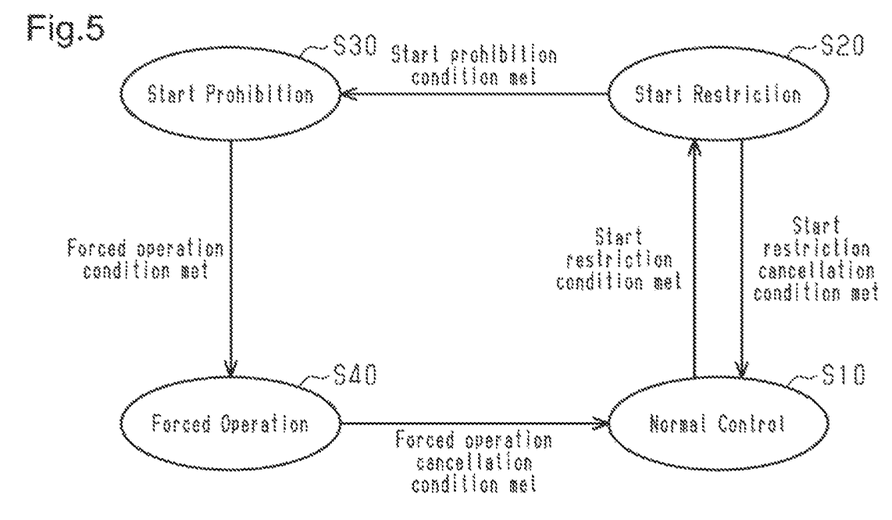
FIG. 5 is a state transition diagram of a start restriction control.

As shown in FIG. 5, in the start restriction control, the controller 31 transitions to any one of a normal control state S10, a start restriction state S20, a start prohibition state S30, and a forced operation state S40. The controller 31 performs control according to each of the states S10 to S40.

The normal control state S10 is a state in which vehicle speed limit is not imposed. When the controller 31 is in the normal control state S10, the controller 31 calculates a target vehicle speed from the accelerator operation amount detected by the accelerator sensor 34. The controller 31 calculates a target rotation speed from the target vehicle speed. The target rotation speed is a rotation speed for causing the forklift 10 to reach the target vehicle speed. Further, the controller 31 determines whether to move the forklift 10 forward or backward based on the operated direction of the direction lever 17. The controller 31 generates a command including information indicating the target rotation speed and information indicating the rotation direction of the traveling motors 41, and gives the command to the travel controller 43. The travel controller 43 controls the traveling motors 41 so that the traveling motors 41 rotate at the target rotation speed specified by the command. The travel controller 43 controls the traveling motors 41 so that the traveling motors 41 rotate in the rotation direction specified by the command. As a result, in the normal control state S10, the forklift 10 travels at a vehicle speed corresponding to the operation amount of the accelerator pedal 16.

The start restriction state S20 is a state in which a vehicle speed upper limit value [km/h] is set to 0 to restrict the start of the forklift 10 from a stopped state. The start refers to a transition of the forklift 10 from a state in which the forklift 10 is stopped to a state in which the forklift 10 is traveling. The vehicle speed upper limit value may be a value greater than 0. The restriction of start includes prohibition of the start and start of the forklift 10 in a state in which the vehicle speed upper limit value is set. When the vehicle speed upper limit value is set, the controller 31 controls the vehicle speed of the forklift 10 such that the vehicle speed does not exceed the vehicle speed upper limit value. For example, when the target vehicle speed calculated from the accelerator operation amount is less than the vehicle speed upper limit value, the controller 31 calculates the target rotation speed from the target vehicle speed calculated from the accelerator operation amount. On the other hand, when the target vehicle speed calculated from the accelerator operation amount is greater than or equal to the vehicle speed upper limit value, the controller 31 calculates the target rotation speed using the vehicle speed upper limit value instead of the target vehicle speed. Then, the controller 31 gives a command to the travel controller 43 such that the target rotation speed and the rotation speed of the traveling motor 41 agree with each other. When the vehicle speed upper limit value is 0, the forklift 10 is prohibited from traveling. In the start restriction state S20, the warning unit 58 issues a warning.

The start prohibition state S30 is a state in which the start of the forklift 10 is prohibited by setting the vehicle speed upper limit value to 0. In the start prohibition state S30, the warning by the warning unit 58 is strengthened as compared to the start restriction state S20. To strengthen the warning refers to, for example, to make the sound emitted by the buzzer 59 louder or to shorten the interval at which the buzzer 59 emits the sound. Further, the warning may be strengthened by switching from the warning by one of the buzzer 59 and the lamp 60 to the warning by both.

The forced operation state S40 is a state in which a vehicle speed limit is imposed on the forklift 10 by setting the vehicle speed upper limit value. The vehicle speed upper limit value set in the forced operation state S40 is a value greater than 0 and less than the maximum vehicle speed that can be reached by the forklift 10. The vehicle speed upper limit value set in the forced operation state S40 may be set to, for example, a vehicle speed allowed at the time of evacuation traveling of the forklift 10. In the forced operation state S40, a warning is issued by the warning unit 58. In the forced operation state S40, the warning by the warning unit 58 may be made weaker than in the start prohibition state S30.

When a start restriction condition is met while the controller 31 is in the normal control state S10, the controller 31 transitions to the start restriction state S20. The start restriction condition is met when a first restriction condition, a second restriction condition, and a third restriction condition are all met.

First restriction condition . . . The forklift 10 is in a stopped state.

Second restriction condition . . . There is an obstacle in the start restriction area AA1.

Third restriction condition . . . The parking brake 38 is deactivated.

Whether or not the first restriction condition is met can be determined based on the vehicle speed derived by the controller 31. The controller 31 determines that the forklift 10 is in a stopped state when the vehicle speed is less than or equal to a stop determination threshold [km/h]. The stop determination threshold is set to a value that indicates that the forklift 10 is in a stopped state. The stop determination threshold can be set to any value from 0 [km/h] to 0.5 [km/h], for example.

Whether or not the second restriction condition is met can be determined based on the X coordinate and the Y coordinate of the obstacle. Since the start restriction area AA1 is defined by the X coordinate and the Y coordinate, it is possible to determine whether the obstacle is present in the start restriction area AA1 based on the X coordinate and the Y coordinate of the obstacle.

Whether or not the third restriction condition is met can be determined based on the detection result of the parking switch 37. The third restriction condition may be omitted.

When a start restriction cancellation condition is met in a case in which the controller 31 is in the start restriction state S20, the controller 31 transitions to the normal control state S10. When at least one of the first restriction condition, the second restriction condition, and the third restriction condition is no longer met, the start restriction cancellation condition is met. The expression "at least one" as used herein means "one or more" of desired options. As an example, the expression "at least one" as used herein means "only one option" or "both of two options" if the number of options is two. As another example, the expression "at least one" used herein means "only one option" or "a combination of any two or more options" if the number of options is three or more.

If a start prohibition condition is met when the controller 31 is in the start restriction state S20, the controller 31 transitions to the start prohibition state S30. The start prohibition condition is met when a first prohibition condition, a second prohibition condition, a third prohibition condition, and a fourth prohibition condition are all met.

First prohibition condition . . . The forklift 10 is in a stopped state.
Second prohibition condition . . . An obstacle exists in an area where the forklift 10 is expected to travel.
Third prohibition condition . . . The detection result of the direction sensor 35 indicates reverse movement.
Fourth prohibition condition . . . Accelerator ON.

Whether or not the second prohibition condition is met can be determined based on the detection result of the tire angle sensor 36 and the X coordinate and the Y coordinate of the obstacle. The expected travel area of the forklift 10 is an area in which the forklift 10 is expected to travel among the center restriction area N, the left restriction area NL, and the right restriction area NR. The controller 31 determines the expected travel area based on the tire angle sensor 36. When the angle of the steered wheels 14 detected by the tire angle sensor 36 is greater than or equal to a specified angle in the left turn direction, the controller 31 determines that the forklift 10 is turning left. When the angle of the steered wheels 14 detected by the tire angle sensor 36 is greater than or equal to the specified angle in the right turn direction, the controller 31 determines that the forklift 10 is turning right. The specified angle used to determine a left turn and a right turn can be set to any value in a range of 4° to 6°, for example. When the angle of the steered wheels 14 detected by the tire angle sensor 36 is less than the specified angle, the controller 31 determines that the forklift 10 is traveling straight ahead. The expected travel area in the case of traveling straight ahead is the center restriction area N. The expected travel area in the case of a left turn is the left restriction area NL and the center restriction area N. The expected travel area in the case of a right turn is the right restriction area NR and the center restriction area N. The controller 31 determines that the second prohibition condition is met when the restriction area N, NL, or NR in which the obstacle is present agrees with the expected travel area. When one obstacle is located across two or more of the restriction areas N, NL, and NR or when two or more obstacles are located in different restriction areas N, NL, and NR, the controller 31 determines that an obstacle is present in each of the respective restriction areas N, NL, and NR. In this case, the controller 31 determines that the second prohibition condition is met when any of the restriction areas N, NL, and NR in which an obstacle is present agrees with the expected travel area.

The fourth prohibition condition can be determined based on the detection result of the accelerator sensor 34. The accelerator-on state indicates that the accelerator pedal 16 is being operated by the operator of the forklift 10.

When the forced operation condition is met in a state in which the controller 31 is in the start prohibition state S30, the controller 31 transitions to the forced operation state S40.

Forced operation condition . . . Accelerator Off.

Whether or not the forced operation condition is met can be determined based on the detection result of the accelerator sensor 34. The accelerator-off state indicates that the accelerator pedal 16 is not operated by the operator of the forklift 10.

When a forced operation cancellation condition is met in a case in which the controller 31 is in the forced operation state S40, the controller 31 transitions to the normal control state S10. When at least one of a first cancellation condition, a second cancellation condition, and a third cancellation condition is met, the forcible operation cancellation condition is met.

First cancellation condition . . . There is no obstacle in the start restriction area AA1.
Second cancellation condition . . . The detection result of the direction sensor 35 indicates forward movement.
Third cancellation condition . . . The parking brake 38 is switched from the deactivated state to the activated state after the start restriction is activated.

The third cancellation condition can be determined based on the detection result of the parking switch 37.

<Display Control>

Figure 6:
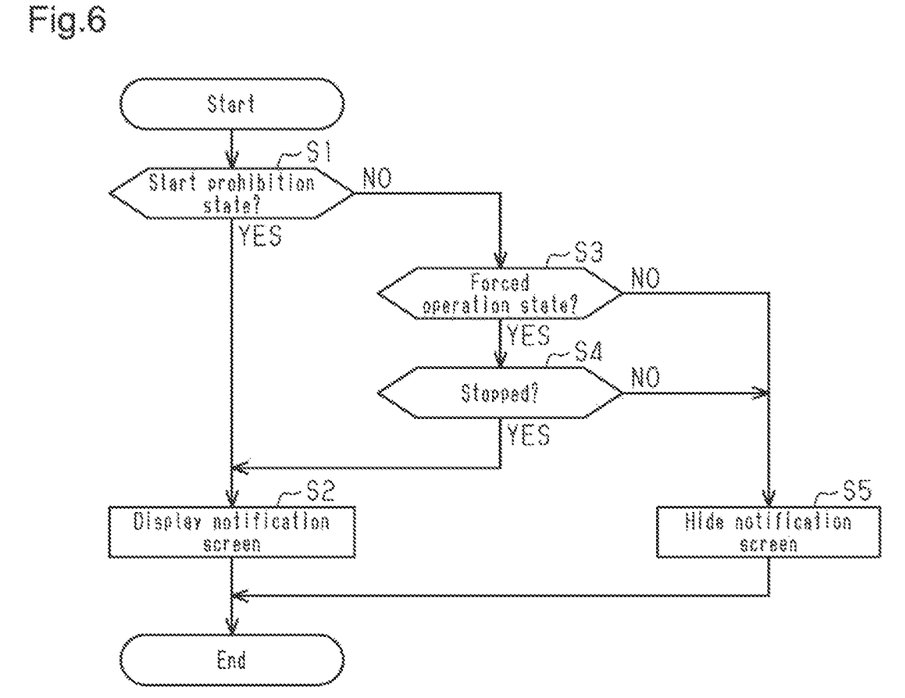
FIG. 6 is a flowchart showing a display control.

Next, a display control performed by the controller 31 will be described. The display control is a control for updating the display content of the display unit 71.

As shown in FIG. 6, in step S1, the controller 31 determines whether the state of the controller 31 is the start prohibition state S30. When the determination result of step S1 is affirmative, the controller 31 performs the process of step S2. When the determination result of step S1 is negative, the controller 31 performs the determination of step S3.

Figure 7:
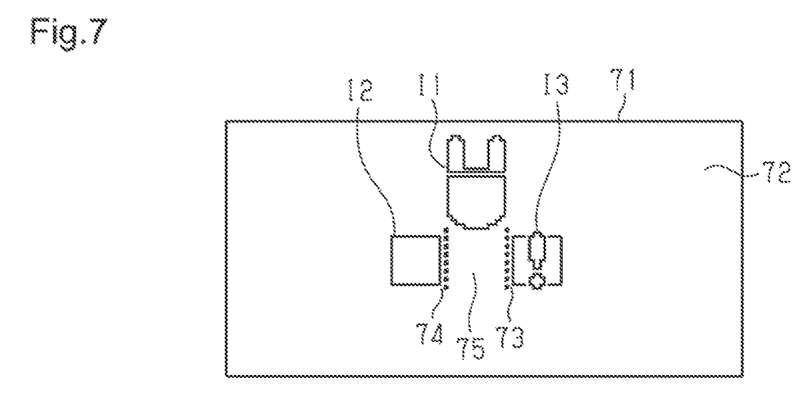
FIG. 7 is a diagram showing an example of a notification screen displayed on a display unit.

As shown in FIGS. 6 and 7, in step S2, the controller 31 displays a notification screen 72 on the display unit 71. The notification screen 72 is a screen for notifying the operator of the forklift 10 of the presence of an obstacle.

As illustrated in FIG. 7, when the notification screen 72 is displayed on the display unit 71, the display unit 71 includes an icon I1, a right rear display area 73, a left rear display area 74, and a center rear display area 75. Information regarding the state of the forklift 10 may be displayed on the notification screen 72. For example, the notification screen 72 may display a remaining power of a battery serving as a power source of the traveling motors 41.

The icon I1 represents the forklift 10. The right rear display area 73 represents the rear side of the icon I1 and the right side of the icon I1. The left rear display area 74 represents the rear side of the icon I1 and the left side of the icon I1. The center rear display area 75 is an area between the right rear display area 73 and the left rear display area 74. The right rear display area 73 corresponds to the right restriction area NR. The left rear display area 74 corresponds to the left restriction area NL. The center rear display area 75 corresponds to the center restriction area N.

When the controller 31 is in the start prohibition state S30, the start of the forklift 10 is restricted. Further, in the start prohibition state S30, a warning is also issued. The cause of the start prohibition state S30, i.e., the obstacle that causes the restriction of the advance of the forklift 10 and the warning is defined as a causal obstacle. When an obstacle is present in the expected travel area, the controller 31 enters the start prohibition state S30. The presence of an obstacle in the expected travel area is defined as a specific condition. An obstacle that meets the specific condition is a causal obstacle.

A case shown in FIG. 4 will be described as an example in which an obstacle is present in each of the right restriction area NR and the left restriction area NL. An obstacle present in the right restriction area NR is referred to as a right obstacle O1, and an obstacle present in the left restriction area NL is referred to as a left obstacle O2. When the operator of the forklift 10 performs an operation to start the forklift 10 rearward and rightward, the controller 31 enters the start prohibition state S30, determining that the right obstacle O1 is a causal obstacle. In this case, a first image I2 and a second image I3 are displayed on the notification screen 72 of the display unit 71, as shown in FIG. 7.

The first image I2 represents an obstacle different from the causal obstacle. The first image I2 is an icon representing an obstacle. The second image I3 represents the causal obstacle. The second image I3 is an icon representing the causal obstacle. The second image I3 is highlighted compared to the first image I2 so that the operator of the forklift 10 can easily recognize the presence of the causal obstacle. In the example shown in FIG. 7, the second image I3 is highlighted by adding an exclamation mark. It is only necessary that the first image I2 and the second image I3 represent obstacles. For example, characters may be displayed as the first image I2 and the second image I3.

The first image I2 is displayed on the display unit 71 in correspondence with the position of the obstacle different from the causal obstacle. When an obstacle is present in the restriction area N, NL, or NR different from the expected travel area in the start restricted area AA1, the controller 31 displays the first image I2 in the display area 73, 74, or 75 that corresponds to the restriction area N, NL, or NR. In the example shown in FIG. 4, the first image I2 is displayed in the left rear display area 74, which corresponds to the left restriction area NL.

The second image I3 is displayed on the display unit 71 in correspondence with the position of the causal obstacle. When an obstacle is present in the expected travel area, the controller 31 displays the second image I3 in the display area 73, 74, or 75 that corresponds to the expected travel area. In the example shown in FIG. 4, the second image I3 is displayed in the right rear display area 73, which corresponds to the right restriction area NR.

In the example illustrated in FIG. 7, the first image I2 is displayed in one of the right rear display area 73, the left rear display area 74, and the center rear display area 75. Depending on the positions and the number of obstacles, the first image I2 is displayed in two of the right rear display area 73, the left rear display area 74, and the center rear display area 75. Similarly, depending on the positions and the number of causal obstacles, the second image I3 is displayed in two of the right rear display area 73, the left rear display area 74, and the center rear display area 75.

When the controller 31 is in the start prohibition state S30, the forklift 10 is in a stopped state. The controller 31 displays the first image I2 and the second image I3 on the display unit 71 in a state in which the forklift 10 is in a stopped state. When the process of step S2 is ended, the controller 31 ends the display control.

In step S3, the controller 31 determines whether the state of the controller 31 is the forced operation state S40. When the determination result of step S3 is affirmative, the controller 31 performs the determination of step S4. When the determination result of step S3 is negative, the controller 31 performs a process of step S5.

In step S4, the controller 31 determines whether the forklift 10 is in a stopped state. When the determination result of step S4 is affirmative, the controller 31 performs the process of step S2. Thus, the notification screen 72 is displayed when the controller 31 is in the forced operation state S40 and the forklift 10 is in a stopped state. When the determination result of step S4 is negative, the controller 31 performs a process of step S5.

In step S5, the controller 31 hides the notification screen 72. That is, the first image I2 and the second image I3 are not displayed on the display unit 71. The controller 31 may display a travel screen instead of the notification screen 72. The travel screen is, for example, a screen on which information related to the travel of the forklift 10 such as the speed of the forklift 10 is displayed. When the process of step S5 is ended, the controller 31 ends the display control.

[Operation of Present Embodiment]

In order to prevent contact between the forklift 10 and an obstacle, the controller 31 performs the start restriction control. In the start prohibition state S30, when an obstacle is present in the expected travel area of the start restriction area AA1, the obstacle is regarded as a causal obstacle, and the start restriction of the forklift 10 and warning are performed. At this time, if an obstacle is present in an area that is in the start restriction area AA1 but is different from the expected travel area, the causal obstacle and an obstacle different from the causal obstacle are present in the start restriction area AA1. When the causal obstacle and an obstacle different from the causal obstacle are present in the start restriction area AA1, it may be difficult for the operator of the forklift 10 to recognize which obstacle has caused the start restriction of the forklift 10 and the warning.

By displaying the second image I3 on the display unit 71, the controller 31 notifies the operator of the forklift 10 of the presence of the causal obstacle. Further, the first image I2 and the second image I3 are displayed in correspondence with the positional relationship between the forklift 10 and the obstacles. This allows the operator of the forklift 10 to recognize which obstacle is the causal obstacle.

[Advantages of Present Embodiment]

(1) The controller 31 displays the first image I2 on the display unit 71 when notifying the operator of the presence of an obstacle different from the causal obstacle. When notifying the operator of the presence of the causal obstacle, the controller 31 displays the second image I3 on the display unit 71. Thus, the controller 31 can notify the operator of the forklift 10 of the presence of the causal obstacle.

(2) The controller 31 displays the second image I3 on the display unit 71 in a case in which travel of the forklift 10 is restricted when a starting operation of the forklift 10 is performed. After the forklift 10 is started, the operator of the forklift 10 often visually confirms the cargo or the destination of the forklift 10, and may not visually confirm the display unit 71 even if the second image I3 is displayed on the display unit 71. Further, after the forklift 10 is started, the display of the travel screen may be requested. In contrast, during a starting operation of the forklift 10, the operator of the forklift 10 is likely to visually confirm the display unit 71. Further, in order to start the forklift 10, it is highly necessary to cause the operator to recognize the presence of a causal obstacle. By displaying the second image I3 on the display unit 71 during a starting operation of the forklift 10, it is possible to cause the operator of the forklift 10 to properly recognize the presence of a causal obstacle.

(3) The controller 31 displays the second image I3 on the display unit 71 when the forklift 10 is in a stopped state. When the forklift 10 is traveling, the operator of the forklift 10 often visually confirms the cargo or the destination of the forklift 10, and may not visually confirm the display unit 71 even if the second image I3 is displayed on the display unit 71. By displaying the second image I3 on the display unit 71 when the forklift 10 stops, it is possible to cause the operator of the forklift 10 to properly recognize the presence of a causal obstacle.

(4) The controller 31 displays the second image I3 in at least one of the right rear display area 73, the left rear display area 74, and the center rear display area 75 based on the positional relationship between the forklift 10 and the causal obstacle. Since the second image I3 is displayed in accordance with the positional relationship between the forklift 10 and the causal obstacle, the operator of the forklift 10 readily recognizes the position of the causal obstacle.

[Modifications]

The above-described embodiment may be modified as follows. The above-described embodiment and the following modifications can be combined if the combined modifications remain technically consistent with each other.

The display unit 71 does not necessarily include the right rear display area 73, the left rear display area 74, or the center rear display area 75. In this case, the first image I2 or the second image I3 may be displayed at a position corresponding to the distance from the forklift 10 to the obstacle and the direction from the forklift 10 toward the obstacle. For example, the second image I3 may be displayed on the display unit 71 such that the longer the distance from the forklift 10 to the causal obstacle is, the longer the distance between the icon I1 and the second image I3 becomes. In addition, the second image I3 may be displayed on the display unit 71 such that the direction from the forklift 10 toward the causal obstacle agrees with the direction from the icon I1 toward the second image I3.

The controller 31 may display the notification screen 72 while the forklift 10 is traveling. For example, the notification screen 72 may be displayed when the controller 31 is in the forced operation state S40 and the forklift 10 is traveling.

In a case in which the obstacle no longer exists in the expected travel area as a result of the expected travel area being changed, the controller 31 may change the second image I3 to the first image I2. This modification will be described with reference to FIG. 4. From the state shown in FIG. 4, the expected travel area may be changed to the center restriction area N due to a change in the angle of the steered wheels 14 detected by the tire angle sensor 36. In this case, the right obstacle O1 becomes an obstacle different from the causal obstacle from the causal obstacle. The controller 31 changes the second image I3 displayed in the right rear display area 73 to the first image I2.

The controller 31 may display the first image I2 on the display unit 71 when notifying the operator of the presence of an obstacle different from the causal obstacle, and may display the second image I3 on the display unit 71 when notifying the operator of the presence of the causal obstacle. Therefore, the controller 31 does not need to change the display positions of the first image I2 and the second image I3 in accordance with the positional relationship between the forklift 10 and the obstacles. The controller 31 does not necessarily need to display the first image I2 and the second image I3 on the display unit 71 at the same time. When only an obstacle different from the causal obstacle is present in the start restriction area AA1, the controller 31 may display only the first image I2 on the display unit 71. When only the causal obstacle is present in the start restriction area AA1, the controller 31 may display only the second image I3 on the display unit 71.

The controller 31 may display the second image I3 on the display unit 71 in the case of the start restriction state S20. In the case of the start restriction state S20, the start of the forklift 10 is restricted when an obstacle is present in the start restriction area AA1. The presence of an obstacle in the start restriction area AA1 is the specific condition.

The forklift 10 may be driven by an engine. In this case, the fourth prohibition condition is excluded from the start prohibition condition. That is, the start prohibition condition is met when the first prohibition condition, the second prohibition condition, and the third prohibition condition are all met. In addition, the forced operation condition is changed to a condition in which the direction lever 17 is put in the neutral position.

The obstacle detection unit 51 may detect the position of an obstacle present in the forward direction in the traveling direction of the forklift 10. In this case, the stereo camera unit 52 is disposed to face the front of the forklift 10. When the obstacle detection unit 51 detects the position of an obstacle present in the forward direction of the forklift 10, the start restriction area AA1 is an area extending forward from the forklift 10. In this case, the third prohibition condition and the second cancellation condition are changed as follows.

Third prohibition condition . . . The detection result of the direction sensor 35 indicates forward movement.

Second cancellation condition . . . The detection result of the direction sensor 35 indicates reverse movement.

The obstacle detection unit 51 may be configured to detect the position of an obstacle present in any of the reverse direction and the forward direction in the traveling direction of the forklift 10. For example, a stereo camera unit 52 for forward movement and a stereo camera unit 52 for reverse movement may be provided. Alternatively, a fish-eye camera may be provided. In this case, the start restriction area AA1 includes a front area extending forward from the forklift 10 and a rear area extending rearward from the forklift 10. When causing the forklift 10 to move forward, the controller 31 performs the start restriction control while regarding the front area as the start restriction area AA1. When causing the forklift 10 to move in reverse, the controller 31 performs the start restriction control while regarding the rear area as the start restriction area AA1.

When the start restriction area AA1 is changed as described above, the position of the display unit 71 at which the first image I2 and the second image I3 are displayed may be changed in accordance with the change of the start restriction area AA1. For example, in a case in which the start restriction area AA1 is in front of the forklift 10, the controller 31 may display the first image I2 and the second image I3 at positions corresponding to the front side of the icon I1.

Instead of the stereo camera unit 52, the obstacle detection unit 51 may include a monocular camera, a time of flight (ToF) camera, a laser imaging detection and ranging (LIDAR) sensor, a millimeter wave radar, or the like. The obstacle detection unit 51 may include a combination of multiple sensors such as a combination of the stereo camera unit 52 and a LIDAR sensor.

The warning unit 58 may be provided in a unit other than the obstacle detection unit 51.

The warning unit 58 may be directly operated by the controller 31.

The forklift 10 may be switchable between an automatic operation and a manual operation.

The controller 31 does not necessarily need to issue a warning in the start prohibition state S30. Similarly, the controller 31 does not necessarily need to issue warning in the forced operation state S40.

Instead of the start prohibition state S30, a first warning state may be a state in which the start of the forklift 10 is not restricted, and only warning is performed. Instead of the forced operation state S40, a second warning state may be a state in which the start of the forklift 10 is not restricted, and only warning is performed. The intensity of the warning is made different between the first warning state and the second warning state. For example, the warning may be stronger in the first warning state than in the second warning state. As described above, the forklift 10 may be any forklift as long as it can perform at least one of the restriction of the travel and the warning due to a causal obstacle.

The obstacle notification device 70 of the industrial vehicle may include a dedicated controller that controls the display unit 71. That is, a controller that performs control related to the traveling operation of the forklift 10 and the cargo handling operation of the forklift 10 and a controller that controls the display unit 71 may be provided separately.

The industrial vehicle may be a towing vehicle used for transportation of a cargo or the like, a picking lift used for picking work, or the like.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An obstacle notification device for an industrial vehicle, the obstacle notification device comprising:
    an obstacle detection unit configured to detect a positional relationship between the industrial vehicle and an obstacle in a start restriction area that extends rearward with respect to a rear of the industrial vehicle;
    a tire angle sensor configured to detect a steered angle of a steered wheel of the industrial vehicle;
    a display unit; and
    processing circuitry, wherein
    the processing circuitry is configured to
        determine an expected travel area of the industrial vehicle based on a detection result of the tire angle sensor;
        display, on the display unit, an image for notifying an operator of the presence of the obstacle, and
        execute at least one of restriction of traveling of the industrial vehicle from a stopped state and issuing a warning, when the obstacle is a causal obstacle meeting a specific condition of being located in both the expected travel area and the start restriction area, and
    the processing circuitry is further configured to
        display a first image on the display unit when notifying the operator of the presence of the obstacle different from the causal obstacle, wherein the obstacle different from the causal obstacle is located in the start restriction area without being located in the expected travel area, and
        display a second image that is different from the first image on the display unit when notifying the operator of the presence of the causal obstacle.

2. The obstacle notification device for the industrial vehicle according to claim 1, wherein
    the processing circuitry is configured to, when a starting operation of the industrial vehicle is performed in a state in which the industrial vehicle is stopped and the causal obstacle is present
        restrict starting of the industrial vehicle from the stopped state, and
        display the second image on the display unit.

3. The obstacle notification device for the industrial vehicle according to claim 2, wherein the processing circuitry is configured to display the second image on the display unit when the industrial vehicle is stopped and the causal obstacle is present.

4. The obstacle notification device for the industrial vehicle according to claim 1, wherein
    the display unit includes:
        an icon representing the industrial vehicle;
        a right rear display area of the start restriction area indicating an area behind and on a right side of the icon;
        a left rear display area of the start restriction area indicating an area behind and on a left side of the icon; and
        a center rear display area of the start restriction area between the right rear display area and the left rear display area, and
    the processing circuitry is configured to display the second image in at least one of the right rear display area, the left rear display area, and the center rear display area based on the positional relationship between the industrial vehicle and the causal obstacle.

5. An industrial vehicle, comprising:
    the obstacle notification device according to claim 1;
    the steered wheel, wherein the processing circuitry is configured to
        execute restriction of traveling of the industrial vehicle and display the second image on the display unit when the causal obstacle exists.

* * * * *